US012629820B2

(12) United States Patent
Du et al.

(10) Patent No.: US 12,629,820 B2
(45) Date of Patent: May 19, 2026

(54) SYSTEMS AND METHODS FOR GRASPING OBJECTS LIKE HUMANS USING ROBOT GRIPPERS

(71) Applicants: NAVER CORPORATION, Gyeonggi-do (KR); Ecole Nationale des Ponts et Chaussées, Marne-la-Vallée (FR)

(72) Inventors: Yuming Du, Champs-sur-Marne (FR); Romain Bregier, Grenoble (FR); Philippe Weinzaepfel, Montbonnot-Saint-Martin (FR); Vincent Lepetit, Talence (FR)

(73) Assignees: Naver Corporation, Gyeonggi-do (KR); Ecole Nationale des Ponts et Chaussées, Marne-la-Vallée (FR)

( * ) Notice: Subject to any disclaimer, the term of this patent is extended or adjusted under 35 U.S.C. 154(b) by 507 days.

(21) Appl. No.: 18/112,826

(22) Filed: Feb. 22, 2023

(65) Prior Publication Data

US 2024/0051125 A1 Feb. 15, 2024

(30) Foreign Application Priority Data

Aug. 9, 2022 (EP) .................................... 22306203

(51) Int. Cl.
| | |
|---|---|
| B25J 9/16 | (2006.01) |
| B25J 15/00 | (2006.01) |
| G06T 7/70 | (2017.01) |

(52) U.S. Cl.
CPC .......... B25J 9/1612 (2013.01); B25J 9/1697 (2013.01); B25J 15/0009 (2013.01); G06T 7/70 (2017.01); G06T 2207/30196 (2013.01)

(58) Field of Classification Search
CPC .... B25J 9/1612; B25J 9/1697; B25J 15/0009; G06T 7/70; G06T 2207/30196; G05B 2219/39505; G05B 2219/39546
See application file for complete search history.

(56) References Cited

U.S. PATENT DOCUMENTS

| | | | |
|---|---|---|---|
| 9,321,176 B1 * | 4/2016 | Sun ...................... | B25J 15/0028 |
| 2020/0302160 A1 * | 9/2020 | Hashimoto ............... | G06T 7/73 |

(Continued)

FOREIGN PATENT DOCUMENTS

WO WO-2015153739 A1 10/2015

OTHER PUBLICATIONS

Sing Bing Kang and K. Ikeuchi, "Toward automatic robot instruction from perception-mapping human grasps to manipulator grasps," in IEEE Transactions on Robotics and Automation, vol. 13, No. 1, pp. 81-95, Feb. 1997, doi: 10.1109/70.554349 (Year: 1997).*

(Continued)

*Primary Examiner* — Truc M Do
*Assistant Examiner* — Tyler Roger Robarge

(57) ABSTRACT

A system includes: a hand module to, based on a demonstration of a human hand grasping an object, determine first and second vectors that are normal to and parallel to a palm of the human hand, respectively, and a position of the human hand; a gripper module to determine third and fourth vectors that are normal to and parallel to a palm of a gripper of a robot, respectively, and a present position of the gripper; and an actuation module to: move the gripper when open such that the present position of the gripper is at the position of the human hand, the third and first vectors are aligned, and the fourth and second vectors are aligned; close fingers of the gripper based on minimizing a first loss; and actuate the fingers of the gripper to minimize a second loss determined based on the first loss and a third loss.

36 Claims, 8 Drawing Sheets

(56)                    References Cited

U.S. PATENT DOCUMENTS

| | | | | |
|---|---|---|---|---|
| 2020/0311977 A1* | 10/2020 | Wood | | G06T 7/75 |
| 2021/0086364 A1* | 3/2021 | Handa | | B25J 9/1628 |
| 2021/0122045 A1* | 4/2021 | Handa | | B25J 13/084 |
| 2021/0233273 A1* | 7/2021 | Spurr | | G06F 18/217 |
| 2021/0248772 A1* | 8/2021 | Iqbal | | G06N 5/04 |
| 2021/0256680 A1* | 8/2021 | Xie | | G06N 3/063 |
| 2022/0009091 A1* | 1/2022 | Moreno Noguer | | B25J 9/1653 |
| 2022/0072707 A1* | 3/2022 | Fan | | G06T 7/73 |
| 2022/0080581 A1* | 3/2022 | Wang | | B25J 19/023 |
| 2022/0301304 A1* | 9/2022 | Hampali | | G06T 7/73 |
| 2023/0070008 A1* | 3/2023 | Kulon | | G06T 17/20 |
| 2023/0281966 A1* | 9/2023 | Vecerik | | G06V 20/647 |
| | | | | 382/157 |

OTHER PUBLICATIONS

T. Zhu, R. Wu, X. Lin and Y. Sun, "Toward Human-Like Grasp: Dexterous Grasping via Semantic Representation of Object-Hand," 2021 IEEE/CVF International Conference on Computer Vision (ICCV), Montreal, QC, Canada, 2021, pp. 15721-15731, doi: 10.1109/ICCV48922.2021.01545. (Year: 2021).*
S. Li et al., "Vision-based Teleoperation of Shadow Dexterous Hand using End-to-End Deep Neural Network," 2019 International Conference on Robotics and Automation (ICRA), Montreal, QC, Canada, 2019, pp. 416-422, doi: 10.1109/ICRA.2019.8794277. (Year: 2019).*
T. Zhu, R. Wu, X. Lin and Y. Sun, "Toward Human-Like Grasp: Dexterous Grasping via Semantic Representation of Object-Hand," 2021 IEEE/CVF International Conference on Computer Vision (ICCV), Montreal, QC, Canada, 2021, pp. 15721-15731, doi: 10.1109/ICCV48922.2021.01545. (Year: 1997).*
Sing Bing Kang and K. Ikeuchi, "Toward automatic robot instruction from perception-mapping human grasps to manipulator grasps," in IEEE Transactions on Robotics and Automation, vol. 13, No. 1, pp. 81-95, Feb. 1997, doi: 10.1109/70.554349 (Year: 2021).*
Wonik Robotics: "Allegro Hand," https://www.wonikrobotics.com/research-robot-hand, 2020.
Barrett Advanced Robotics "Barrett Hand," https://medical.barrett.com/about-barrethand, 2020.
A. Billard, S. Calinon, R. Dillmann, and S. Schaal, "Survey: Robot programming by demonstration," Springer, Tech. Rep., 2008.
A. Handa, K. Van Wyk, W. Yang, J. Liang, Y.-W. Chao, Q. Wan, S. Birchfield, N. Ratliff, and D. Fox, "Dexpilot: Vision-based teleoperation of dexterous robotic hand-arm system," in ICRA, 2020.
A. Jacobson, L. Kavan, and O. Sorkine-Hornung, "Robust inside-outside segmentation using generalized winding numbers," ACM Transactions on Graphics (TOG), vol. 32, No. 4, pp. 1-12, 2013. https://users.cs.utah.edu/~ladislav/jacobson13robust/jacobson13robust.html; https://users.cs.utah.edu/~ladislav/jacobson13robust/jacobson13robust.pdf.
A. Lakshmipathy, D. Bauer, C. Bauer, and N. S. Pollard, "Contact transfer: A direct, user-driven method for human to robot transfer of grasps and manipulations," arXiv preprint arXiv:2110.15532, 2021.
A. Miech, D. Zhukov, J.-B. Alayrac, M. Tapaswi, I. Laptev, and J. Sivic, "Howto100m: Learning a text-video embedding by watching hundred million narrated video clips," in ICCV, 2019.
A. Paszke, S. Gross, F. Massa, A. Lerer, J. Bradbury, G. Chanan, T. Killeen, Z. Lin, N. Gimelshein, L. Antiga, et al., "Pytorch: An imperative style, high-performance deep learning library," in NeurIPS, 2019.
A. Rajeswaran, V. Kumar, A. Gupta, G. Vezzani, J. Schulman, E. Todorov, and S. Levine, "Learning complex dexterous manipulation with deep reinforcement learning and demonstrations," arXiv preprint arXiv:1709.10087, 2017.
A. T. Miller and P. K. Allen, "Examples of 3d grasp quality computations," in ICRA, 1999.
A. T. Miller and P. K. Allen, "Graspit! a versatile simulator for robotic grasping," IEEE Robotics & Automation Magazine, 2004.

B. Calli, A. Singh, A. Walsman, S. Srinivasa, P. Abbeel, and A. M. Dollar, "The ycb object and model set: Towards common benchmarks for manipulation research," in ICAR, 2015.
B. D. Argall, S. Chernova, M. Veloso, and B. Browning, "A survey of robot learning from demonstration," Robotics and autonomous systems, 2009.
B. Wu, I. Akinola, A. Gupta, F. Xu, J. Varley, D. Watkins-Valls, and P. K. Allen, "Generative attention learning: a "general" framework for high-performance multi-fingered grasping in clutter," Autonomous Robots, 2020.
C. Ferrari and J. F. Canny, "Planning optimal grasps." in ICRA, 1992.
D. A. Pomerleau, "Efficient training of artificial neural networks for autonomous navigation," Neural computation, 1991.
E. Corona, A. Pumarola, G. Alenya, F. Moreno-Noguer, and G. Rogez, "Ganhand: Predicting human grasp affordances in multi-object scenes," in CVPR, 2020.
I. Loshchilov and F. Hutter, "Decoupled weight decay regularization," arXiv preprint arXiv:1711.05101, 2017.
J. Lundell, E. Corona, T. N. Le, F. Verdoja, P. Weinzaepfel, G. Rogez, F. Moreno-Noguer, and V. Kyrki, "Multi-fingan: Generative coarse-tofine sampling of multi-finger grasps," in ICRA, 2021.
J. Romero, D. Tzionas, and M. J. Black, "Embodied hands: Modeling and capturing hands and bodies together," ACM Transactions on Graphics (ToG), 2017.
J. Varley, J. Weisz, J. Weiss, and P. Allen, "Generating multi-fingered robotic grasps via deep learning," in IROS, 2015. http://webcluster.cs.columbia.edu/~allen/PAPERS/iros15_grasp_varley.pdf.
J.J. Gibson, The ecological approach to visual perception. Houghton Mifflin, 1979.
K. Schmeckpeper, O. Rybkin, K. Daniilidis, S. Levine, and C. Finn, "Reinforcement learning with videos: Combining offline observations with interaction," arXiv preprint arXiv:2011.06507, 2020.
L. Muller, A. A. Osman, S. Tang, C.-H. P. Huang, and M. J. Black, "On self-contact and human pose," in CVPR, 2021.
M. Liu, Z. Pan, K. Xu, K. Ganguly, and D. Manocha, "Generating grasp poses for a high-dof gripper using neural networks," in IROS, 2019.
M. Sundermeyer, A. Mousavian, R. Triebel, and D. Fox, "Contactgraspnet: Efficient 6-dof grasp generation in cluttered scenes," in ICRA, 2021.
O. Taheri, N. Ghorbani, M. J. Black, and D. Tzionas, "Grab: A dataset of whole-body human grasping of objects," in ECCV, 2020.
Q. Lu, M. Van der Merwe, and T. Hermans, "Multi-fingered active grasp learning," in IROS, 2020.
S. Bambach, S. Lee, D. J. Crandall, and C. Yu, "Lending a hand: Detecting hands and recognizing activities in complex egocentric interactions," in ICCV, 2015.
S. Birchfield, N. Ratliff, and D. Fox, "Dexpilot: Vision-based teleoperation of dexterous robotic hand-arm system," in ICRA, 2020.
S. Brahmbhatt, A. Handa, J. Hays, and D. Fox, "Contactgrasp: Functional multi-finger grasp synthesis from contact," in IROS, 2019.
S. Hampali, M. Rad, M. Oberweger, and V. Lepetit, "Honnotate: A method for 3d annotation of hand and object poses," in CVPR, 2020.
T. Zhang, Z. McCarthy, O. Jow, D. Lee, X. Chen, K. Goldberg, and P. Abbeel, "Deep imitation learning for complex manipulation tasks from virtual reality teleoperation," in ICRA, 2018.
T. Zhu, R. Wu, X. Lin, and Y. Sun, "Toward human-like grasp: Dexterous grasping via semantic representation of object-hand," in ICCV, 2021.
Y. Hasson, G. Varol, C. Schmid, and I. Laptev, "Towards unconstrained joint hand-object reconstruction from rgb videos," in 3DV, 2021.
Y. Hasson, G. Varol, D. Tzionas, I. Kalevatykh, M. J. Black, I. Laptev, and C. Schmid, "Learning joint reconstruction of hands and manipulated objects," in CVPR, 2019.
Y. Labbe, J. Carpentier, M. Aubry, and J. Sivic, "Cosypose: Consistent multi-view multi-object 6d pose estimation," in ECCV, 2020.

(56) References Cited

OTHER PUBLICATIONS

Y. Zhou, C. Barnes, J. Lu, J. Yang, and H. Li, "On the continuity of rotation representations in neural networks," in CVPR, 2019.

Y.-W. Chao, W. Yang, Y. Xiang, P. Molchanov, A. Handa, J. Tremblay, Y. S. Narang, K. Van Wyk, U. Iqbal, S. Birchfield, et al., "Dexycb: A benchmark for capturing hand grasping of objects," in CVPR, 2021.

Y. Qin, Y. Wu, S. Liu, H. Jiang, R. Yang, Y. Fu, X. Wang, "DexMV: Imitation Learning for Dexterous Manipulation from Human Videos" arXiv preprint arXiv:2108.05877v4, Dec. 2, 2021.

Sing Bing Kang et al: "Woard Automatic Robot Instruction from Perception-Mapping Human Grasps to Manipulator Grasps", IEEE Transactions on robotics and Automation, IEEE Inc, New York, US, vol. 13, No. 1; Feb. 1, 1997.

Brahmbhatt Smarth et al: "ContactDB: Analyzing and Predicting Grasp Contact via Thermal Imaging", 2019 IEEE/CVF Converence on Computer Vision and Pattern Recognition (CVPR), III, Jun. 15, 2019.

Hasson Yana et al: "Learning Joint Reconstruction of Hands and Manipulated Objects", 2019 IEEE/CVF Converence on Computer Vision and Pattern Recognition (CVPR), IEEE, Jun. 15, 2019.

Aravind Sivakumar et al: "Robotic Telekinesis: Learning a Robotic Hand Imitator by Watching Humans on Youtube", arxiv.org, Conrell University Ithaca, NY; Feb. 21, 2022.

European Search Report for European Application No. 22 30 6203 dated Jan. 16, 2023.

* cited by examiner human hand to Allegro Gripper human hand to Barrett Gripper

SYSTEMS AND METHODS FOR GRASPING OBJECTS LIKE HUMANS USING ROBOT GRIPPERS

CROSS-REFERENCE TO RELATED APPLICATIONS

This application claims the benefit of European Application No. 22306203.5, filed on Aug. 9, 2022. The entire disclosure of the application referenced above is incorporated herein by reference.

FIELD

The present disclosure relates to robot systems and methods and more particularly to systems and methods for controlling multi-fingered grippers of robots to grasp objects like humans grasp the objects.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Navigating robots are one type of robot and are an example of an autonomous system that is mobile and may be trained to navigate environments without colliding with objects during travel. Navigating robots may be trained in the environment in which they will operate or trained to operate regardless of environment.

Navigating robots may be used in various different industries. One example of a navigating robot is a package handler robot that navigates an indoor space (e.g., a warehouse) to move one or more packages to a destination location. Another example of a navigating robot is an autonomous vehicle that navigates an outdoor space (e.g., roadways) to move one or more occupants/humans from a pickup to a destination. Another example of a navigating robot is a robot used to perform one or more functions inside a residential space (e.g., a home).

Other types of robots are also available, such as residential robots configured to perform various domestic tasks, such as putting liquid in a cup, filling a coffee machine, etc.

SUMMARY

In a feature, a robot system includes: a hand module configured to, based on a demonstration of a human hand grasping an object, determine (a) a first vector that is normal to a palm of the human hand, (b) a second vector that is parallel to the palm of the human hand, and (c) a position of the human hand; a gripper module configured to determine (a) a third vector that is normal to a palm of a gripper of a robot, (b) a fourth vector that is parallel to the palm of the gripper of the robot, and (c) a present position of the gripper; and an actuation module configured to: (1) move the gripper when the gripper is open such that the present position of the gripper is at the position of the human hand, the third vector is aligned with the first vector, and the fourth vector is aligned with the second vector; after (1), (2) close fingers of the gripper based on minimizing an object penetration loss; and when the object penetration loss is minimized, (3)

actuate the fingers of the gripper to minimize a total loss determined based on the object penetration loss and at least one other loss.

In further features, the object penetration loss increases when a tip of a finger of the gripper extends into an exterior surface of the object.

In further features, the object penetration loss decreases as the tip of the finger of the gripper approaches the exterior surface of the object.

In further features, the gripper module is configured to determine the third vector, the fourth vector, and the present position of the gripper based on images from a camera of the robot.

In further features, the gripper module is configured to determine the third vector, the fourth vector, and the present position of the gripper based on measurements from one or more sensors of the robot.

In further features, a total loss module is configured to determine the total loss based on the object penetration loss and the at least one other loss, where the at least one other loss includes a contact heatmap loss that: decreases as contact between the gripper and the exterior surface of the object becomes more similar to contact between the human hand and an exterior surface of the object; and increases as contact between the gripper and the exterior surface of the object becomes less similar to contact between the human hand and the exterior surface of the object.

In further features, a total loss module is configured to determine the total loss based on the object penetration loss and the at least one other loss, where the at least one other loss includes an orientation loss that: decreases as at least one of (a) the third vector approaches the first vector and (b) the fourth vector approaches the second vector; and increases as at least one of (a) the third vector moves away from the first vector and (b) the fourth vector moves away from the second vector.

In further features, a total loss module is configured to determine the total loss based on the object penetration loss and the at least one other loss, where the at least one other loss includes a gripper self-penetration loss that: increases as contact between a first portion of the gripper and a second portion of the gripper increases; and decreases as contact between the first portion of the gripper and the second portion of the gripper decreases.

In further features, a total loss module is configured to determine the total loss based on the object penetration loss and the at least one other loss, where the at least one other loss includes: a contact heatmap loss that: decreases as contact between the gripper and the exterior surface of the object becomes more similar to contact between the human hand and the exterior surface of the object; and increases as contact between the gripper and the exterior surface of the object becomes less similar to contact between the human hand and the exterior surface of the object; an orientation loss that: decreases as at least one of (a) the third vector approaches the first vector and (b) the fourth vector approaches the second vector; and increases as at least one of (a) the third vector moves away from the first vector and (b) the fourth vector moves away from the second vector; and a gripper self-penetration loss that: increases as contact between a first portion of the gripper and a second portion of the gripper increases; and decreases as contact between the first portion of the gripper and the second portion of the gripper decreases.

In a feature, a robot system includes: an object mesh module configured to determine a polygon mesh of an exterior surface of an object to be grasped by a gripper of a robot; a hand mesh module configured to determine a polygon mesh of an exterior surface of a human hand grasping the object; a gripper mesh module configured to determine a polygon mesh of an exterior surface of the gripper of the robot; and an actuation module configured to actuate actuators of the robot based on minimizing a total loss determined based on: an object penetration loss determined based on the polygon mesh of the exterior surface of the gripper relative to the polygon mesh of the exterior surface of the object; a contact heatmap loss determined based on (a) the polygon mesh of the exterior surface of the gripper relative to the polygon mesh of the exterior surface of the object and (b) the polygon mesh of the exterior surface of the human hand relative to the polygon mesh of the exterior surface of the object; and an orientation loss determined based on an orientation of vectors of the gripper relative to an orientation of vectors of the human hand.

In further features, the total loss is determined further based on a gripper self-penetration loss determined based on contact between a first portion of the gripper and a second portion of the gripper.

In further features, a total loss module is configured to: increase the gripper self-penetration loss as contact between a first portion of the gripper and a second portion of the gripper increases; and decrease the gripper self-penetration loss as contact between the first portion of the gripper and the second portion of the gripper decreases.

In further features, an object penetration loss module is configured to increase the object penetration loss when a tip of a finger of the gripper extends into the exterior surface of the object.

In further features, the object penetration loss module is configured to decrease the object penetration loss as the tip of the finger of the gripper approaches the exterior surface of the object.

In further features, a total loss module is configured to determine the orientation loss based on images from a camera of the robot.

In further features, the total loss module is configured to determine the orientation loss further based on at least one image of the human hand grasping the object.

In further features, a total loss module is configured to determine the orientation loss based on measurements from one or more sensors of the robot.

In further features, a total loss module is configured to: decrease the contact heatmap loss as contact between the gripper and the exterior surface of the object becomes more similar to contact between the human hand and the exterior surface of the object; and increase the contact heatmap loss as contact between the gripper and the exterior surface of the object becomes less similar to contact between the human hand and the exterior surface of the object.

In a feature, a method (a computer-implemented method) includes: based on a demonstration of a human hand grasping an object, determining (a) a first vector that is normal to a palm of the human hand, (b) a second vector that is parallel to the palm of the human hand, and (c) a position of the human hand; determining (a) a third vector that is normal to a palm of a gripper of a robot, (b) a fourth vector that is parallel to the palm of the gripper of the robot, and (c) a present position of the gripper; (1) actuating one or more actuators of the robot and moving the gripper when the gripper is open such that the present position of the gripper is at the position of the human hand, the third vector is aligned with the first vector, and the fourth vector is aligned with the second vector; after (1), (2) actuating one or more actuators of the robot and closing fingers of the gripper based on minimizing an object penetration loss; and when the object penetration loss is minimized, (3) actuating one or more actuators of the robot and actuating the fingers of the gripper to minimize a total loss determined based on the object penetration loss and at least one other loss.

In further features, the method further includes increasing the object penetration loss when a tip of a finger of the gripper extends into an exterior surface of the object.

In further features, the method further includes decreasing the object penetration loss as the tip of the finger of the gripper approaches the exterior surface of the object.

In further features, determining the third vector, the fourth vector, and the present position of the gripper includes determining the third vector, the fourth vector, and the present position of the gripper based on images from a camera of the robot.

In further features, determining the third vector, the fourth vector, and the present position of the gripper includes determining the third vector, the fourth vector, and the present position of the gripper based on measurements from one or more sensors of the robot.

In further features, the method further includes determining the total loss based on the object penetration loss and the at least one other loss, where the at least one other loss includes a contact heatmap loss and the method further includes: decreasing the contact heatmap loss as contact between the gripper and the exterior surface of the object becomes more similar to contact between the human hand and an exterior surface of the object; and increasing the contact heatmap loss as contact between the gripper and the exterior surface of the object becomes less similar to contact between the human hand and the exterior surface of the object.

In further features, the method further includes determining the total loss based on the object penetration loss and the at least one other loss, where the at least one other loss includes an orientation loss and the method further includes: decreasing the orientation loss as at least one of (a) the third vector approaches the first vector and (b) the fourth vector approaches the second vector; and increasing the orientation loss as at least one of (a) the third vector moves away from the first vector and (b) the fourth vector moves away from the second vector.

In further features, the method further includes determining the total loss based on the object penetration loss and the at least one other loss, where the at least one other loss includes a gripper self-penetration loss and the method further includes: increasing the gripper self-penetration loss as contact between a first portion of the gripper and a second portion of the gripper increases; and decreasing the gripper self-penetration loss as contact between the first portion of the gripper and the second portion of the gripper decreases.

In further features, the method further includes determining the total loss based on the object penetration loss and the at least one other loss, where the at least one other loss includes a contact heatmap loss, an orientation loss, and a gripper self-penetration loss and the method further includes: decreasing the contact heatmap loss as contact between the gripper and the exterior surface of the object becomes more similar to contact between the human hand and the exterior surface of the object; increasing the contact heatmap loss as contact between the gripper and the exterior surface of the object becomes less similar to contact between the human hand and the exterior surface of the object; decreasing the orientation loss as at least one of (a) the third vector approaches the first vector and (b) the fourth vector approaches the second vector; and increasing the orientation loss as at least one of (a) the third vector moves away from the first vector and (b) the fourth vector moves away from the second vector; increasing the gripper self-penetration loss as contact between a first portion of the gripper and a second portion of the gripper increases; and decreasing the gripper self-penetration loss as contact between the first portion of the gripper and the second portion of the gripper decreases.

In a feature, a method includes: determining a polygon mesh of an exterior surface of an object to be grasped by a gripper of a robot; determining a polygon mesh of an exterior surface of a human hand grasping the object; determining a polygon mesh of an exterior surface of the gripper of the robot; determining an object penetration loss based on the polygon mesh of the exterior surface of the gripper relative to the polygon mesh of the exterior surface of the object; determining a contact heatmap loss based on (a) the polygon mesh of the exterior surface of the gripper relative to the polygon mesh of the exterior surface of the object and (b) the polygon mesh of the exterior surface of the human hand relative to the polygon mesh of the exterior surface of the object; determining an orientation loss determined based on an orientation of vectors of the gripper relative to an orientation of vectors of the human hand; and actuating actuators of the robot based on minimizing a total loss determined based on the object penetration loss, the contact heatmap loss, and the orientation loss.

In further features, the method further includes determining a gripper self-penetration loss determined based on contact between a first portion of the gripper and a second portion of the gripper, where determining the total loss includes determining the total loss further based on the gripper self-penetration loss.

In further features, the method further includes: increasing the gripper self-penetration loss as contact between a first portion of the gripper and a second portion of the gripper increases; and decreasing the gripper self-penetration loss as contact between the first portion of the gripper and the second portion of the gripper decreases.

In further features, the method further includes increasing the object penetration loss when a tip of a finger of the gripper extends into the exterior surface of the object.

In further features, the method further includes decreasing the object penetration loss as the tip of the finger of the gripper approaches the exterior surface of the object.

In further features, the method further includes the orientation loss based on images from a camera of the robot.

In further features, the method further includes determining the orientation loss further based on at least one image of the human hand grasping the object.

In further features, the method further includes determining the orientation loss based on measurements from one or more sensors of the robot.

In further features, the method further includes: decreasing the contact heatmap loss as contact between the gripper and the exterior surface of the object becomes more similar to contact between the human hand and the exterior surface of the object; and increasing the contact heatmap loss as contact between the gripper and the exterior surface of the object becomes less similar to contact between the human hand and the exterior surface of the object.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

A robot may include a camera. Images from the camera and measurements from other sensors of the robot can be used to control actuation of the robot, such as propulsion, actuation of one or more arms, and/or actuation of a gripper.

Robots with multi-fingered grippers can be used to perform advanced manipulation tasks, such as grasping of objects, if trained to perform the tasks. The present application involves controlling a robot with a multi-fingered gripper to grasp an object like a human hand grasped an object. How the hand grasped the object may be captured in one or more images, using a motion capture system, using a three dimensional (3D) scanner, a demonstration database, or in another suitable manner. The control can be used with different types of multi-fingered grippers with different numbers of fingers and/or different orientations of fingers. The control produces robotic grasps that mimic the human hand orientation and contact area with the object while minimizing penetration of the object and the robot itself. No gripper specific tuning is needed.

Grasping of an object by a human hand is captured. A position of the hand and vectors of the palm of the hand are determined based on the capture. A control module first opens the gripper to fully open. The control module second moves the open gripper to the same position of the hand relative to the object and aligns vectors of the gripper with the vectors of the palm of the hand. Third, the control module closes the fingers of the gripper toward the exterior surface of the object based on minimizing an object penetration loss that penalizes penetration of the exterior surface of the object by the tips of one or more of the fingers. Fourth, the control module fine tunes the positions of the fingers based on minimizing a total loss that is a function of the object penetration loss and three other losses and that encourages a valid grasp of the object by the gripper while capturing the similarity between the human hand grasp and the grasp by the gripper.

Figure 1:
FIGS. 1 and 2 are functional block diagrams of example robots.

FIG. 1 is a functional block diagram of an example implementation of a navigating robot 100. The navigating robot 100 is a vehicle and is mobile. The navigating robot 100 includes a camera 104 that captures images within a predetermined field of view (FOV). The predetermined FOV may be less than or equal to 360 degrees around the navigating robot 100. The operating environment of the navigating robot 100 may be an indoor space (e.g., a building), an outdoor space, or both indoor and outdoor spaces.

The camera 104 may be, for example, a grayscale camera, a red, green, blue (RGB) camera, or another suitable type of camera. The camera 104 may or may not capture depth (D) information, such as in the example of a grayscale-D camera or a RGB-D camera. The camera 104 may be fixed to the navigating robot 100 such that the orientation of the camera 104 (and the FOV) relative to the navigating robot 100 remains constant. The camera 104 may update (capture images) at a predetermined frequency, such as 60 hertz (Hz), 120 Hz, or another suitable frequency.

The navigating robot 100 may include one or more propulsion devices 108, such as one or more wheels, one or more treads/tracks, one or more moving legs, one or more propellers, and/or one or more other types of devices configured to propel the navigating robot 100 forward, backward, right, left, up, and/or down. One or a combination of two or more of the propulsion devices 108 may be used to propel the navigating robot 100 forward or backward, to turn the navigating robot 100 right, to turn the navigating robot 100 left, and/or to elevate the navigating robot 100 vertically upwardly or downwardly. The robot 100 is powered, such as via an internal battery and/or via an external power source, such as wirelessly (e.g., inductively).

While the example of a navigating robot is provided, the present application is also applicable to other types of robots with a camera.

Figure 2:
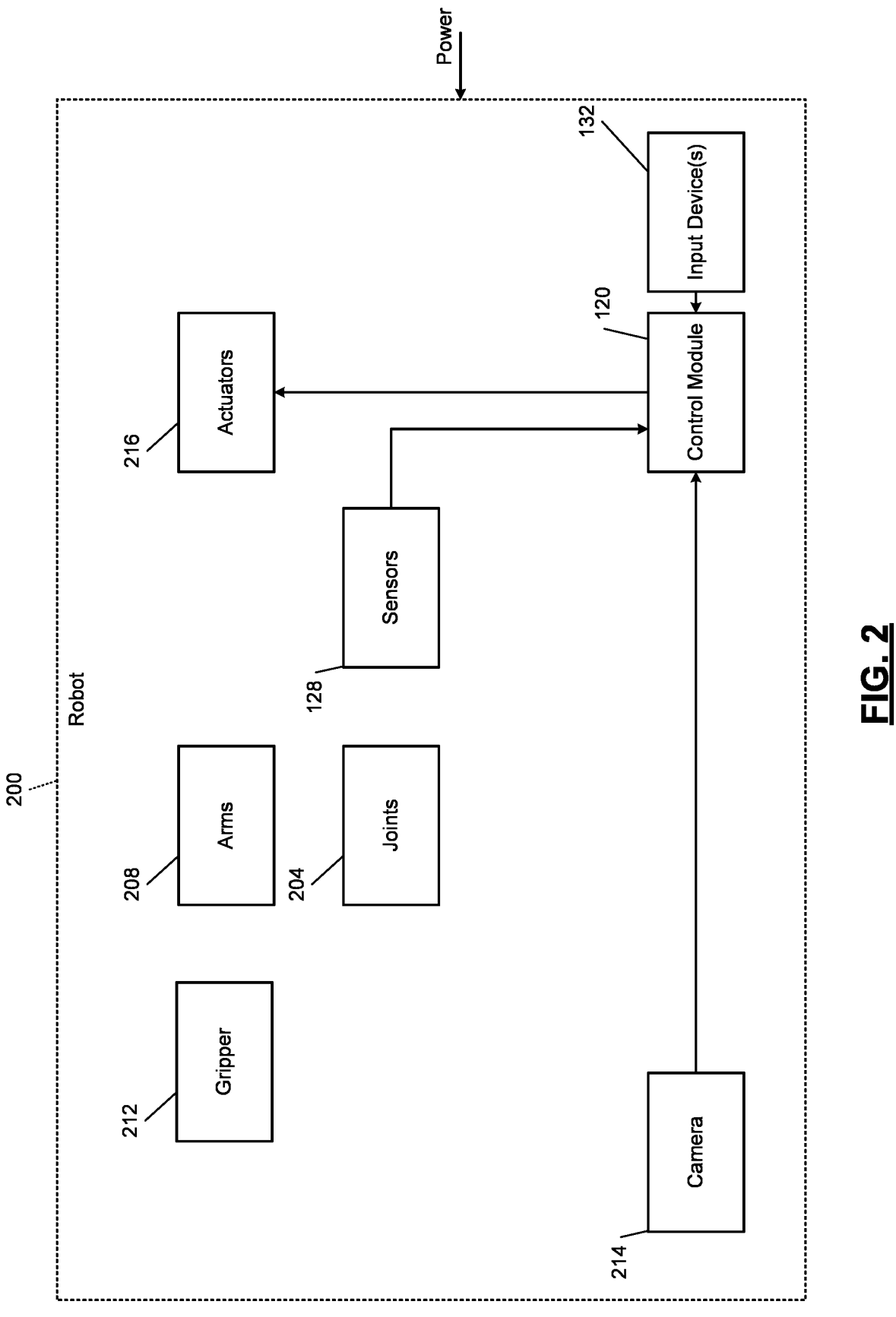

For example, FIG. 2 includes a functional block diagram of an example robot 200. The robot 200 may be stationary or mobile. The robot 200 may be, for example, a 5 degree of freedom (DoF) robot, a 6 DoF robot, a 7 DoF robot, an 8 DoF robot, or have another number of degrees of freedom. In various implementations, the robot 200 may be the Panda Robotic Arm by Franka Emika, the mini Cheetah robot, or another suitable type of robot.

The robot 200 is powered, such as via an internal battery and/or via an external power source, such as alternating current (AC) power. AC power may be received via an outlet, a direct connection, etc. In various implementations, the robot 200 may receive power wirelessly, such as inductively.

The robot 200 includes a plurality of joints 204 and arms 208. Each arm may be connected between two joints. Each joint may introduce a degree of freedom of movement of a (multi fingered) gripper 212 of the robot 200. The robot 200 includes actuators 216 that actuate the arms 208 and the gripper 212. The actuators 216 may include, for example, electric motors and other types of actuation devices.

In the example of FIG. 1, a control module 120 controls actuation of the propulsion devices 108. In the example of FIG. 2, the control module 120 controls the actuators 216 and therefore the actuation (movement, articulation, actuation of the gripper 212, etc.) of the robot 200. The control module 120 may include a planner module configured to plan movement of the robot 200 to perform one or more different tasks. An example of a task includes grasping and moving an object. The present application, however, is also applicable to other tasks. The control module 120 may, for example, control the application of power to the actuators 216 to control actuation. Actuation of the actuators 216, actuation of the gripper 212, and actuation of the propulsion devices 108 will generally be referred to as actuation of the robot.

The robot 200 also includes a camera 214 that captures images within a predetermined field of view (FOV). The predetermined FOV may be less than or equal to 360 degrees around the robot 200. The operating environment of the robot 200 may be an indoor space (e.g., a building), an outdoor space, or both indoor and outdoor spaces.

The camera 214 may be, for example, a grayscale camera, a red, green, blue (RGB) camera, or another suitable type of camera. The camera 214 may or may not capture depth (D) information, such as in the example of a grayscale-D camera or a RGB-D camera. The camera 214 may be fixed to the robot 200 such that the orientation of the camera 214 (and the FOV) relative to the robot 200 remains constant. The camera 214 may update (capture images) at a predetermined frequency, such as 60 hertz (Hz), 120 Hz, or another suitable frequency.

The control module 120 controls actuation of the robot based on one or more images from the camera while a human is grasping an object. The control is applicable to multiple different types of grippers without tailoring for the specific gripper used.

The control module 120 may control actuation additionally or alternatively based on measurements from one or more sensors 128 and/or one or more input devices 132. Examples of sensors include position sensors, temperature sensors, location sensors, light sensors, rain sensors, force sensors, torque sensors, etc. Examples of input devices include touchscreen displays, joysticks, trackballs, pointer devices (e.g., mouse), keyboards, steering wheels, pedals, and/or one or more other suitable types of input devices.

While the example of a physical robot is described, the present application is also applicable to simulations using differentiable robot gripper models and gradient-based iterative approaches to find optimal actuator values that mimic a human grasp of an object.

Figure 3:
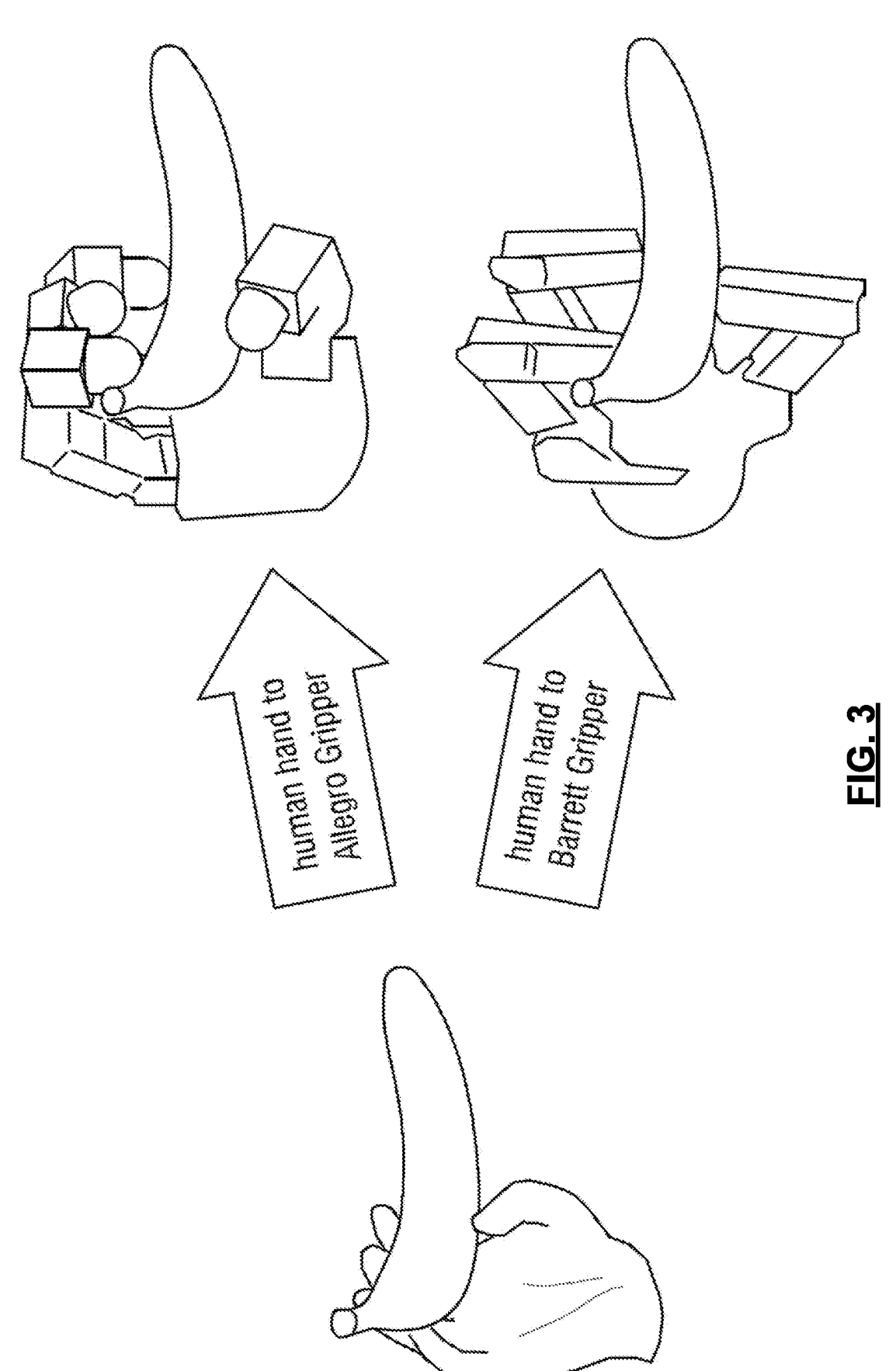
FIG. 3 includes an example illustration of an image of a human hand grasping an object and images of two different types of grippers controlled as described herein to grasp the object as closely as possible to how the human grasped the object.

FIG. 3 includes an example illustration of an image of a human hand gripping an object (a banana) on the left. FIG. 3 also includes on the right images of two different types of grippers controlled as described herein to grasp the object as closely as possible to how the human hand grasped the object. The two different types of grippers illustrated are of the Allegro Hand by Wonik Robotics Co., Ltd. (top) and the BarrettHand by Barrett Advanced Robotics. The present application, however, is also applicable to other types of grippers with different numbers of fingers and/or different orientations of fingers.

Figure 4:
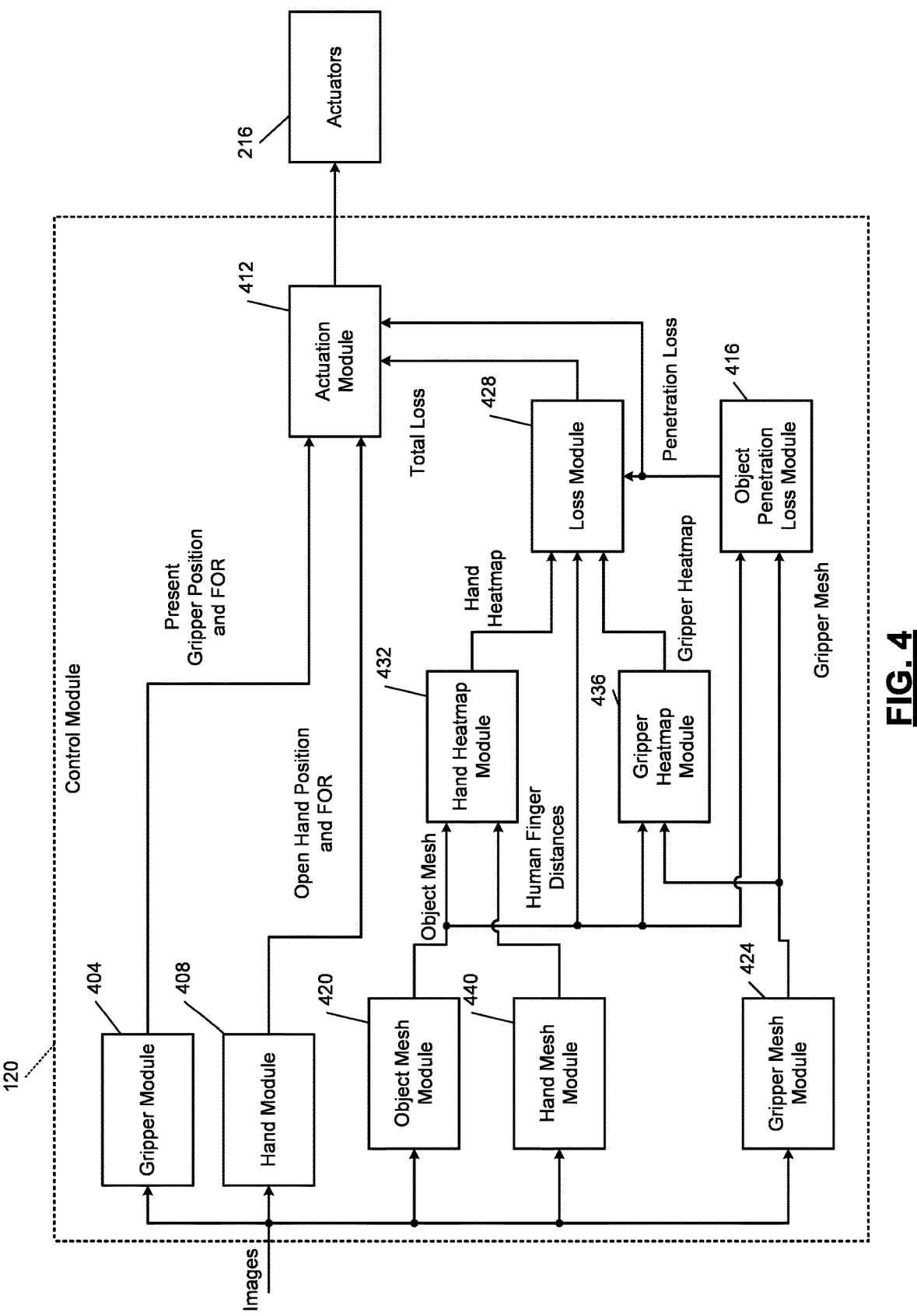
FIG. 4 is a functional block diagram of an example implementation of a control module.

FIG. 4 is a functional block diagram of an example implementation of the control module 120. A gripper module 404 and a hand module 408 receive a demonstration of a human hand grasping an object. Based on the demonstration of the human hand grasping the object as intended to be grasped by the gripper 212 of the robot, the hand module 408 detects a hand of the human and determines a frame of reference of the hand if the hand was fully open and a position of the hand in space. The demonstration may be, for example, one or more images from the camera, captured using a motion capture system, captured using a 3D scanner, stored in memory and collected beforehand, determined by an algorithm configured to determine how a human would grasp an object, or obtained in another suitable manner.

Figure 5:
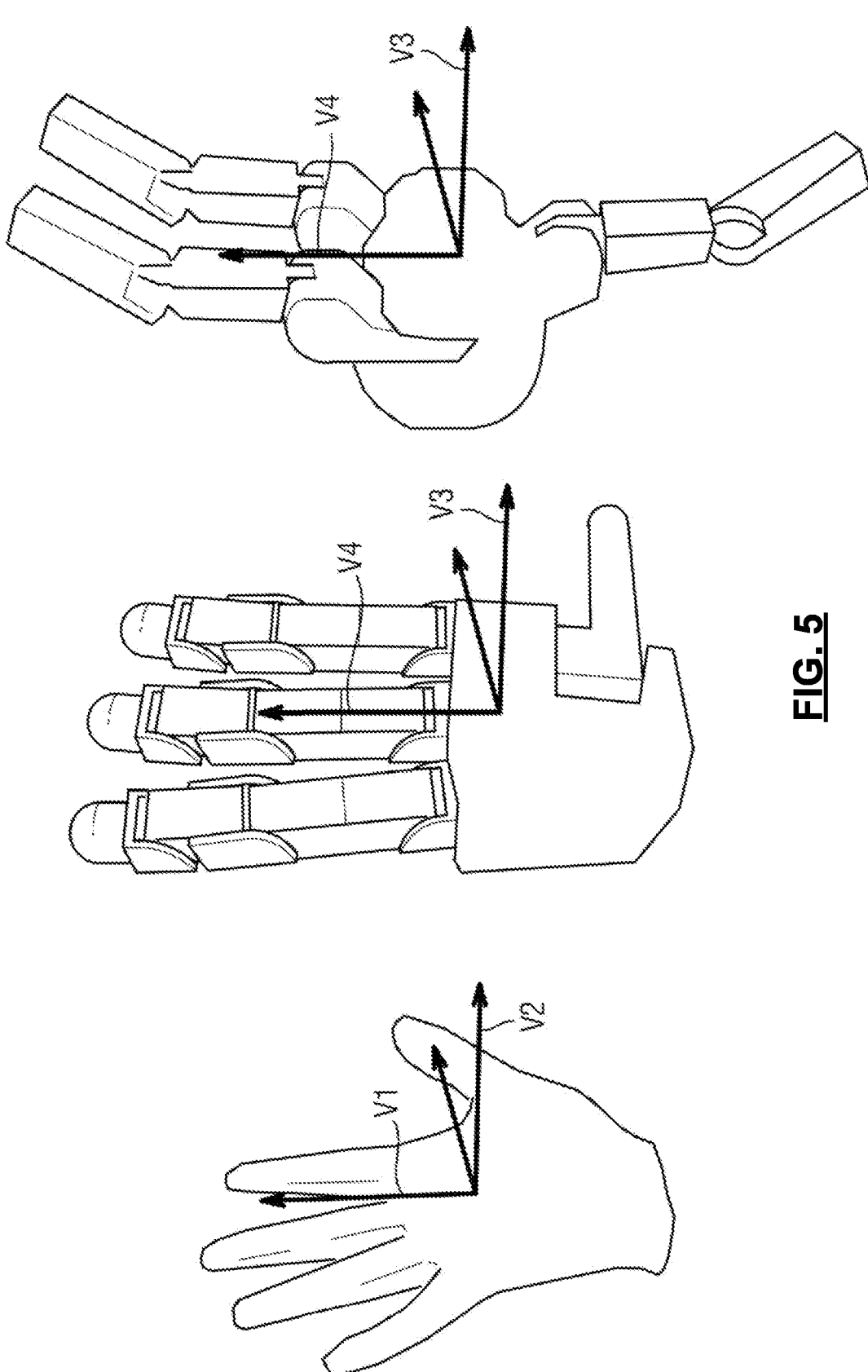
FIG. 5 includes an example illustration of a human hand when fully open and a frame of reference (FOR) of the human hand defined by vectors extending from a joint on the palm of the hand.

FIG. 5 includes an example illustration of a human hand when fully open and a frame of reference (FOR) of the human hand defined by vectors extending from a joint on the palm of the hand. The joint on the palm of the hand when fully open is used as the position of the hand in space. A first vector V1 represents the normal vector relative to the palm when fully open, and a second vector V2 represents the forward vector extending in a direction of fingers when fully open and is perpendicular to the blue vector. A third vector extends perpendicularly to the first and second vectors. FIG. 5 also includes the same positions and vectors illustrated on the two different example grippers. In particular, FIG. 5 shows a third vector V3 that is normal to a palm of a gripper and a fourth vector V4 that is parallel to the palm of the gripper.

First, an actuation module 412 actuates the actuators 216 to open the gripper 212 to fully open. Second, the actuation module 412 actuates the actuators 216 to move the present FOR and position of the gripper 212 to the position of the fully open hand and the FOR of the hand when fully open. This involves the actuation module 412 actuating the actuators 216 to move the position of the gripper 212 to the position of the hand when fully open (determined based on the hand grasping the object). This also involves the actuation module 412 actuating the actuators 216 to match the present FOR of the gripper 212 to the FOR of the hand when fully open (determined based on the hand grasping the object). This moves the fully open gripper 212 to the same orientation of the hand if the hand was fully open (instead of grasping the object).

The gripper module 404 determines the present FOR of the gripper 212 and the present position of joint of the gripper 212 of the robot (e.g., based on a present image from a camera (during movement and/or actuation of the gripper 212)). As discussed above, images from the camera may be captured and received at a predetermined frequency, such as 60 Hz, 120 Hz, or another suitable frequency. In various implementations, the gripper module 404 may determine the present FOR of the gripper 212 and the present position of the gripper 212 using measurements from one or more of the sensors 128.

When/after the present position of the gripper 212 is at the position of the hand fully open and the present FOR of the gripper 212 is aligned with the FOR of the hand (the third vector V3 being aligned with the first vector V1 and the fourth vector V4 being aligned with the second vector V2), the actuation module 412 begins actuating the actuators 216 to close the gripper 212 (the fingers) toward the object. The actuation module 412 actuates the actuators 216 to close the gripper 212 based on minimizing a penetration loss. Minimizing the penetration loss involves actuating the actuators 216 and closing the gripper to adjust the object penetration loss to a minimum value that is closest to zero or zero.

An object penetration loss module 416 determines the (present) penetration loss based on positions of tips of the fingers of the gripper 212 relative to the exterior surface of the object to be grasped by the robot. The object penetration loss module 416 decreases the object penetration loss as one or more of the tips of the fingers of the gripper 212 approach the exterior surface of the object to be grasped. However, the object penetration loss module 416 increases the object penetration loss when the tip of a finger of the gripper 212 penetrates the exterior surface of the object to be grasped. In this manner, the object penetration loss module 416 penalizes penetration of the object by the tips of one or more of the fingers of the robot. The object penetration loss may reach a minimum value when the tips of the fingers of the gripper 212 are all touching the exterior surface of the object to be grasped but not penetrating the object.

The object penetration loss module 416 may determine the object penetration loss based on a present mesh of the gripper 212 (gripper mesh) and a mesh of the object to be grasped (object mesh). The object mesh and the gripper mesh are polygon meshes including vertices of shapes (e.g., triangles) defining the outer surface of the object and the gripper, respectively.

An object mesh module 420 determines the object mesh (e.g., based on the image) of the human hand grasping the object as intended to be grasped by the gripper 212 of the robot. The same image is used to determine the frame of reference of the hand and the position of the hand.

A gripper mesh module 424 determines the present gripper mesh (e.g., based on the present image from the camera (during movement and/or actuation of the gripper 212)). As discussed above, images from the camera may be captured and received at a predetermined frequency, such as 60 Hz, 120 Hz, or another suitable frequency. In various implementations, the gripper module 404 may determine the present gripper mesh using measurements from one or more of the sensors 128.

The object penetration loss module 416 may determine the object penetration loss using one or more equations and/or lookup tables. For example, the object penetration loss module 416 may determine the object penetration loss using the equation:

$$\mathcal{L}_1 = \alpha_1 \mathcal{L}_{push} + \beta_1 \mathcal{L}_{pull} + \gamma_1 \mathcal{L}_{normal},$$

where $\mathcal{L}_1$ is the object penetration loss, $\mathcal{L}_{push}$ is a push loss that aims at avoiding penetration of the object by the gripper by pushing the penetrated parts of the gripper 212 toward the nearest surface on the object mesh, $\mathcal{L}_{pull}$ is a pull loss that encourages contact between the gripper 212 and the object when the tips of the fingers of the gripper 212 are close to the exterior surface of the object, and $\mathcal{L}_{normal}$ is a normal loss that helps to ensure realistic contact between the tips of the fingers of the gripper 212 and the exterior surface of the object by encouraging normals of the object and gripper meshes to be opposite at contact points of the tips of the fingers with the exterior surface of the object. $\alpha_1$, $\beta_1$, and $\gamma_1$ are predetermined values that are calibrated, such as 2.4, 7, and 0.001, respectively, or other suitable values.

The penetration loss module 416 may determine the push loss, $\mathcal{L}_{push}$ based on $\mathcal{U}_{robot} \subset \mathcal{M}_{robot}$ the set of vertices on the gripper mesh that are inside of the object mesh and $\mathcal{U}_{object} \subset \mathcal{M}_{object}$ the set of vertices on the object mesh that are inside of the gripper mesh. In various implementations, the sets of vertices may be determined using an inside/outside segmentation algorithm, such as described in A. Jacobson, et al., Robust Inside Outside Segmentation Using Generalized Winding Numbers, ACM ToG, 2013, which is incorporated herein in its entirety. While an example is provided, another inside/outside segmentation algorithm may be used. For example, the penetration loss module 416 may determine the push loss using the equation:

$$\mathcal{L}_{push} = \sum_{0_i \in \mathcal{U}_{object}} \tanh\left(\frac{d(0_i, \mathcal{M}_{robot})}{\alpha_2}\right) + \sum_{r_k \in \mathcal{U}_{robot}} \tanh\left(\frac{d(r_k, \mathcal{M}_{object})}{\alpha_2}\right),$$

where $\alpha_2$ is a predetermined value, such as 4 centimeters (cm) or another suitable value, where $d(0_i, \mathcal{M}_{robot})$ denotes a distance (such as a L2-distance) of $0_i$ to the set of vertices of the gripper mesh $\mathcal{M}_{robot}$ and where $d(r_k, \mathcal{M}_{object})$ denotes the distance of $r_k$ to the set of vertices of the object mesh $\mathcal{M}_{object}$.

The penetration loss module 416 may determine the pull loss $\mathcal{L}_{pull}$ using the equation:

$$\mathcal{L}_{pull} = \sum\nolimits_{r_k \in \mathcal{M}_{robot}} \tanh\left(\frac{\min(d(r_k, \mathcal{M}_{object}), \delta)}{\beta_2}\right),$$

where $V = \{r_k \in \mathcal{M}_{robot} | d(r_k, \mathcal{M}_{robot}) < \delta\}$ is the set of vertices of the gripper mesh that are closer to the object surface than a predetermined value $\delta$ (e.g., 2 millimeters (mm)) or another suitable value, and $\beta_2$ is a predetermined value, such as 6 centimeters (cm) or another suitable value.

The penetration loss module 416 may determine the normal loss, $\mathcal{L}_{normal}$ using the equation:

$$\mathcal{L}_{normal} = \sum\nolimits_{r_k \in \mathcal{V}} 1 + \langle N(r_k), N(o_i^k) \rangle,$$

where $N(\cdot)$ denotes the unit normal vector at a given vertex, and $o_i^k = argmin_{o_i \in \mathcal{M}_{object}} d(r_k, o_i)$ denotes the closet point on the object for any vertex $r_k \in V$. The predetermined values (hyperparameters) may be calibrated and set based on experimentation.

When the object penetration loss has been minimized, the actuation module 412 begins actuating the actuators 216 to refine the grasping of the object by the gripper 212. More specifically, the actuation module 412 actuates the actuators 216 based on minimizing a total loss. Minimizing the total loss involves actuating the actuators 216 and closing the gripper to adjust the total loss to a minimum value that is closest to zero or zero.

A loss module 428 determines the total loss based on the object penetration loss, a contact heatmap loss, a hand orientation loss, and a gripper self-penetration loss. The loss module 428 determines the total loss using one or more equations or lookup tables that, for example, relate the object penetration loss, the contact heatmap loss, the hand orientation loss, and the gripper self-penetration loss to total losses. For example, the loss module 428 may determine the total loss using the equation:

$$\mathcal{L} = \lambda_c \mathcal{L}_c + \lambda_O \mathcal{L}_O + \lambda_I \mathcal{L}_I + \lambda_s L_s$$

where $\mathcal{L}$ is the total loss, $\mathcal{L}_c, \mathcal{L}_O, \mathcal{L}_I, \mathcal{L}_S$ are the contact heatmap loss, the hand orientation loss, the object penetration loss and the gripper self-penetration loss, respectively, and $\mathcal{L}_c, \mathcal{L}_O, \mathcal{L}_I, \mathcal{L}_S$ are a contact heatmap weight value, a hand orientation weight value, an object penetration loss weight value, and a gripper self-penetration weight value, respectively. The contact heatmap weight value, the hand orientation weight value, the object penetration loss weight value, and the gripper self-penetration weight value may be predetermined values and may be set based on experimentation. For example, the contact heatmap weight value, the hand orientation weight value, the object penetration loss weight value, and the gripper self-penetration weight value may be 10, 10, 0.5, and 1, respectively, or other suitable values.

The object penetration loss is discussed above. The loss module 428 determines the contact heatmap loss based on a hand contact heatmap and a gripper contact heatmap. The loss module 428 determines the contact heatmap loss using one or more equations or lookup tables that relate hand contact heatmaps and gripper contact heatmaps to contact heatmap losses.

A hand heatmap module 432 determines the hand contact heatmap. A gripper heatmap module 436 determines the gripper contact heatmap. Grasps are similar if their contact regions on the target object are similar, the contact heatmap loss encourages the contact regions of the human hand on the object and the contact regions of the gripper 212 on the object to be similar.

Figure 6:
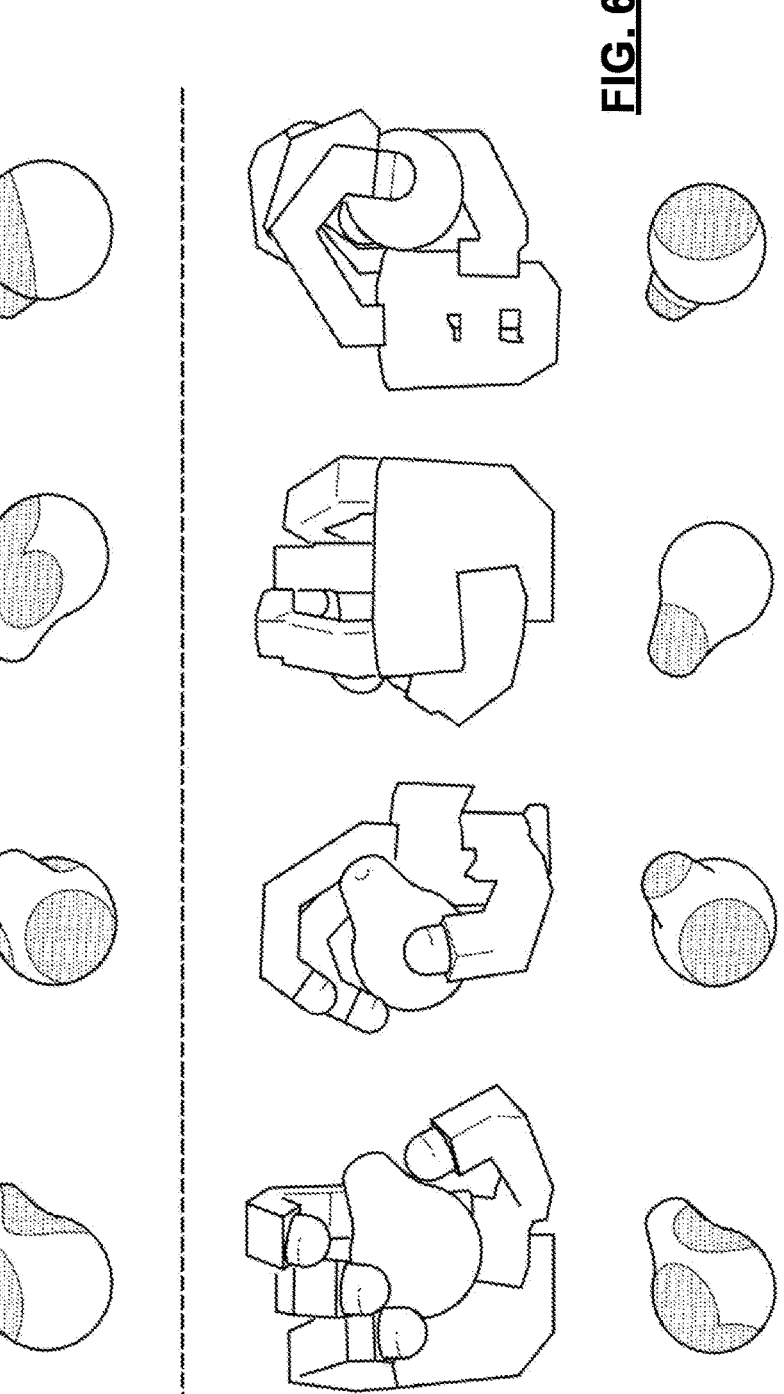
FIG. 6 includes example illustrations of hand contact heatmaps (top) and gripper contact heatmaps (bottom) on an object.

FIG. 6 includes example illustrations of hand contact heatmaps (top) and gripper contact heatmaps (bottom) on an object. Lighter regions may denote low contact regions on the object while darker regions denote high contact regions on the object.

The hand heatmap module 432 may determine the hand contact heatmap based on vertices of the object mesh and a mesh of the hand (hand mesh). The hand heatmap module 432 may determine the hand contact heatmap using one or more equations or lookup tables that relate the vertices of object meshes and hand meshes to hand contact heatmaps. For example only, at each vertex of the object mesh $o_i$, the hand heatmap module 432 may determine the hand contact heatmap using the equation:

$$H^{hand}(o_i) = \exp(-d(o_i, \mathcal{M}_{hand}))/\tau$$

where $H^{ha}$ is the value of the hand contact heatmap at the vertex of the object mesh $o_i$, $d(o_i, \mathcal{M}_{hand})$ is a distance (e.g., an L2-distance) between the vertex of the object mesh and the hand mesh $\mathcal{M}_{and}$ (e.g., a distance between the vertex and its closest point on the hand mesh) and z is a predetermined value. $\tau$ may be set based on experimentation and may be, for example, 0.01 meters (m) or another suitable value. $\tau$ may be used to define contacts in a soft manner, such as $H^{hand}(o_i) = 1$ when $d(o_i, \mathcal{M}) = 0$ and $H^{hand}(o_i) \approx 0$ when $d(o_i, \mathcal{M}) >> \tau$.

A hand mesh module 440 determines the hand mesh based on the demonstration of the human hand grasping the object as intended to be grasped by the gripper 212 of the robot. The same demonstration is used to determine the frame of reference of the hand and the position of the hand. The hand mesh is a polygon mesh including vertices of shapes (e.g., triangles) defining the outer surface of the hand.

The gripper heatmap module 436 determines the gripper contact heatmap based on vertices of the object mesh and the gripper mesh. The gripper heatmap module 436 may determine the hand contact heatmap using one or more equations or lookup tables that relate the vertices of object meshes and gripper meshes to gripper contact heatmaps. For example only, at each vertex of the object mesh $o_i$, the gripper heatmap module 436 may determine the gripper contact heatmap using the equation:

$$H^{gripper}(o_i) = \exp(-d(o_i, \mathcal{M}_{robot}))/\tau$$

where $H^{gripper}$ is the value of the gripper contact heatmap at the vertex of the object mesh $o_i$, $d(o_i, \mathcal{M}_{robot})$ is a distance (e.g., an L2-distance) between the vertex of the object mesh and the gripper mesh (e.g., a distance between the vertex and its closest point on the gripper mesh) and $\tau$ is the predetermined value.

For example only, the loss module 428 may determine the contact heatmap loss using the equation:

$$\mathcal{L}_c = \sum\nolimits_{o_i \in \mathcal{M}_{object}} |H^{hand}(o_i) - H_{gripper}(o_i)|.$$

The loss module 428 determines the hand orientation loss based on one or more vectors (e.g., the forward and normal vectors V2 and V1) of the (open) hand FOR (discussed above) and one or more vectors (e.g., the forward and normal vectors V4 and V3) of the present (open) gripper FOR. The loss module 428 determines the hand contact heatmap loss using one or more equations or lookup tables that relate hand vectors and gripper vectors to hand orientation losses. For example only, the loss module 428 may determine the hand orientation loss using the equation:

$$\mathcal{L}_O = |n_{gripper} - n_{ha}| + |f_{gripper} - f_{hand}|,$$

where $n_{gripper}$ is the present normal vector V3 of the (open) gripper, $n_{hand}$ is the normal vector V1 of the open hand, $f_{gripper}$ is the present forward vector V4 of the (open) gripper, $f_{hand}$ is the forward vector V2 of the open hand. Normal vectors may be the unit normal vector of the palm surface. Forward vectors may be the unit vectors that are parallel to the palm surface and point in the "pushing" direction. Examples of forward and normal vectors of a hand and grippers are illustrated in FIG. 5. Grasps have high similarity if the hand/gripper are oriented similarly with respect to the object, thus resulting in similar free space around the object and thus potentially to a similar affordance. The hand orientation loss encourages orientation of the gripper 212 to be made similar to the orientation of the hand.

The loss module 428 determines the gripper self-penetration loss based on push loss $\mathcal{L}_{push}$, the object mesh, and the gripper mesh. The loss module 428 may determine the gripper self-penetration loss using one or more equations or lookup tables that relate push losses, object meshes, and gripper meshes to gripper self-penetration losses. In various implementations, the loss module 428 may determine the self-penetration loss using the push loss but only applying the push loss between the gripper mesh and the gripper mesh itself resulting in the gripper self-penetration loss.

Figure 7:
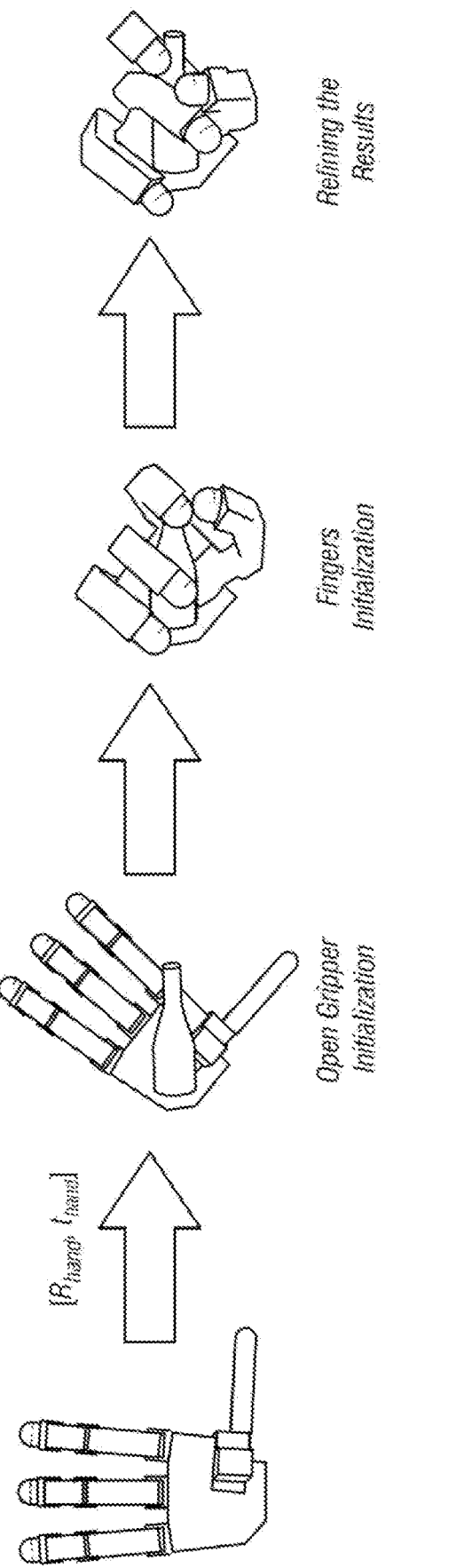
FIG. 7 includes an example illustration of controlling a gripper to grasp an object.

FIG. 7 includes an example illustration of controlling the gripper 212 to grasp an object. As described above, first the gripper 212 is opened. Second, the gripper is moved to the position of the open hand and aligned with the FOR of the open hand as to minimize the hand orientation loss. Third, the fingers of the gripper 212 are actuated to minimize the distance between the fingertips of the gripper 212 and the nearest hand contact region on the object as well as to minimize the object and self-penetration losses (finger initialization). Fourth, the gripper 212 is actuated to minimize the total loss (refining).

Figure 8:
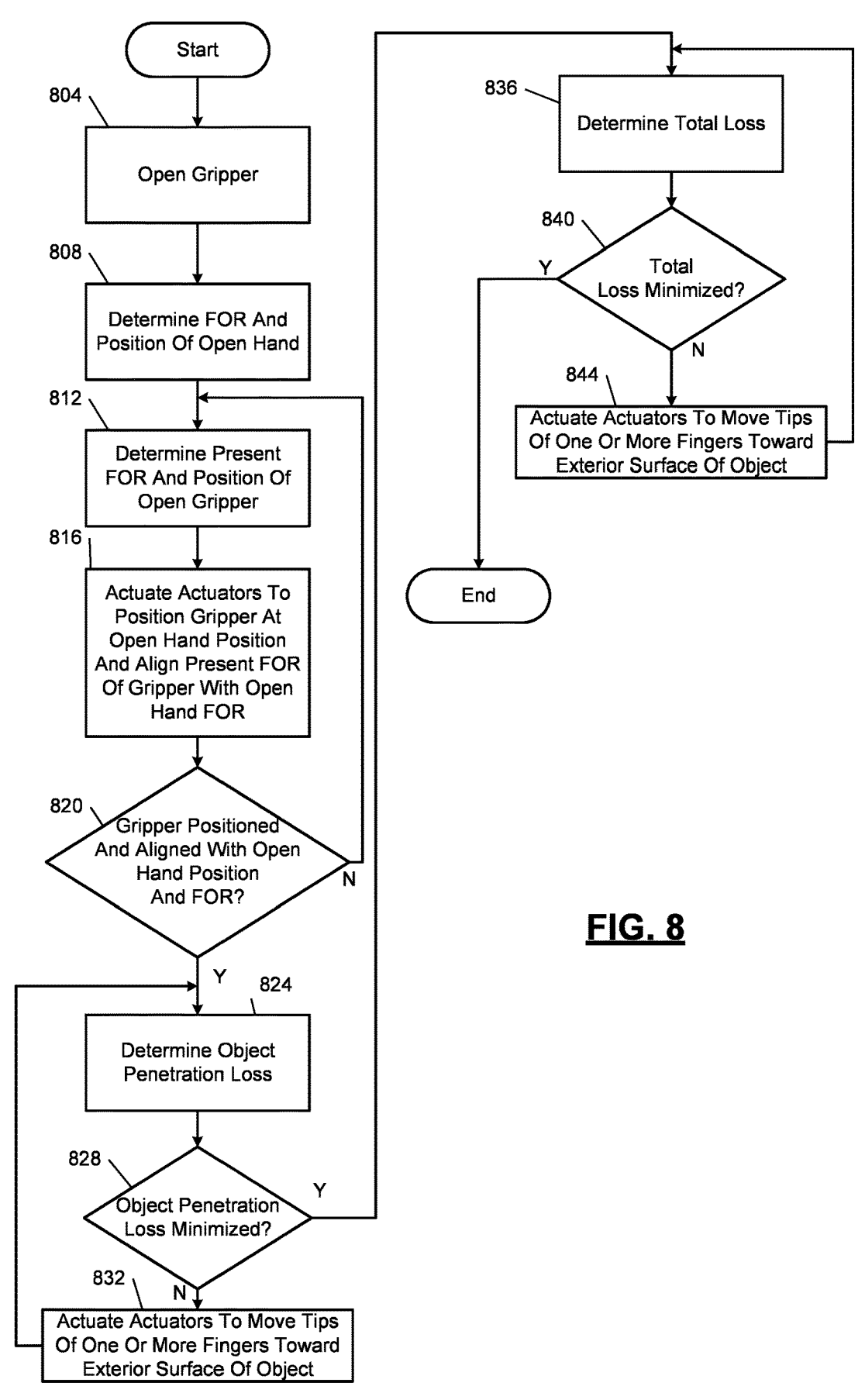
FIG. 8 includes a flowchart depicting an example method of controlling the gripper to grasp an object as the object is grasped by a human hand.

FIG. 8 includes a flowchart depicting an example method of controlling the gripper 212 to grasp an object as the object is grasped by a human hand. How the human hand grasped the object is captured in one or more demonstrations. Control begins with 804 where the actuation module 412 opens the gripper 212.

At 808, the hand module 408 determines the FOR and position of the hand if fully open (instead of grasping the object). At 812, the gripper module 404 determines the present position and FOR of the gripper 212.

At 816, the actuation module 412 actuates the actuators 216 to move the (open) gripper 212 to the position of the open hand and to align the present FOR of the gripper 212 with the FOR of the open hand. At 820, the actuation module 412 determines whether the present position of the gripper 212 and the present FOR of the gripper 212 match the position of the open hand and the FOR of the open hand, respectively. If 820 is true, control continues with 824. If 820 is false, control returns to 812.

At 824, the loss module 428 determines the present contact, object and self-penetration losses. At 828, the actuation module 412 determines whether the object penetration loss is minimized (e.g., is a minimal value, such as 0 or less than a predetermined minimum value or after reaching a predetermined number of iterations). If 828 is true, control continues with 836. If 828 is false, control continues with 832. At 832, the actuation module 412 actuates the actuators 216 to move the tip of one or more of the fingers of the gripper 212 toward the contact regions of the hand on the exterior surface of the object to be grasped while avoiding interpenetration. Control returns to 824 to update the contact, object and self-penetration losses and continue until these losses are minimized.

At 836, the loss module 428 determines the total loss, as described above. At 840, the actuation module 412 determines whether the total loss is minimized (e.g., is a minimal value, such as 0 or less than a predetermined minimum value or after reaching a predetermined number of iterations). If 840 is true, grasping of the object like the human is complete and control ends. If 840 is false, control continues with 844. At 844, the actuation module 412 actuates the actuators 216 to move the gripper 212 toward the exterior surface of the object to be grasped and diminish the total loss. Control returns to 836 to update the total loss.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A robot system, comprising:
a hand module configured to, based on a demonstration of a human hand grasping an object, determine (a) a first vector that is normal to a palm of the human hand, (b) a second vector that is parallel to the palm of the human hand, and (c) a position of the human hand;
a gripper module configured to determine (a) a third vector that is normal to a palm of a gripper of a robot, (b) a fourth vector that is parallel to the palm of the gripper of the robot, and (c) a present position of the gripper; and
an actuation module configured to:
(1) move the gripper when the gripper is open such that the present position of the gripper is at the position of the human hand, the third vector is aligned with the first vector, and the fourth vector is aligned with the second vector;
after (1), (2) close fingers of the gripper based on minimizing an object penetration loss; and
when the object penetration loss is minimized, (3) actuate the fingers of the gripper to minimize a total loss determined based on the object penetration loss and at least one other loss.

2. The robot system of claim 1 wherein the object penetration loss increases when a tip of a finger of the gripper extends into an exterior surface of the object.

3. The robot system of claim 2 wherein the object penetration loss decreases as the tip of the finger of the gripper approaches the exterior surface of the object.

4. The robot system of claim 1 wherein the gripper module is configured to determine the third vector, the fourth vector, and the present position of the gripper based on images from a camera of the robot.

5. The robot system of claim 1 wherein the gripper module is configured to determine the third vector, the fourth vector, and the present position of the gripper based on measurements from one or more sensors of the robot.

6. The robot system of claim 1 further comprising a total loss module configured to determine the total loss based on the object penetration loss and the at least one other loss, wherein the at least one other loss includes a contact heatmap loss that:

decreases as contact between the gripper and the exterior surface of the object becomes more similar to contact between the human hand and an exterior surface of the object; and increases as contact between the gripper and the exterior surface of the object becomes less similar to contact between the human hand and the exterior surface of the object.

7. The robot system of claim 1 further comprising a total loss module configured to determine the total loss based on the object penetration loss and the at least one other loss, wherein the at least one other loss includes an orientation loss that:

decreases as at least one of (a) the third vector approaches the first vector and (b) the fourth vector approaches the second vector; and increases as at least one of (a) the third vector moves away from the first vector and (b) the fourth vector moves away from the second vector.

8. The robot system of claim 1 further comprising a total loss module configured to determine the total loss based on the object penetration loss and the at least one other loss, wherein the at least one other loss includes a gripper self-penetration loss that:

increases as contact between a first portion of the gripper and a second portion of the gripper increases; and decreases as contact between the first portion of the gripper and the second portion of the gripper decreases.

9. The robot system of claim 1 further comprising a total loss module configured to determine the total loss based on the object penetration loss and the at least one other loss, wherein the at least one other loss includes:

a contact heatmap loss that:

decreases as contact between the gripper and the exterior surface of the object becomes more similar to contact between the human hand and the exterior surface of the object; and increases as contact between the gripper and the exterior surface of the object becomes less similar to contact between the human hand and the exterior surface of the object;

an orientation loss that:

decreases as at least one of (a) the third vector approaches the first vector and (b) the fourth vector approaches the second vector; and increases as at least one of (a) the third vector moves away from the first vector and (b) the fourth vector moves away from the second vector; and a gripper self-penetration loss that:

increases as contact between a first portion of the gripper and a second portion of the gripper increases; and decreases as contact between the first portion of the gripper and the second portion of the gripper decreases.

10. A robot system, comprising:

an object mesh module configured to determine a polygon mesh of an exterior surface of an object to be grasped by a gripper of a robot;

a hand mesh module configured to determine a polygon mesh of an exterior surface of a human hand grasping the object;

a gripper mesh module configured to determine a polygon mesh of an exterior surface of the gripper of the robot; and an actuation module configured to actuate actuators of the robot based on minimizing a total loss determined based on:

an object penetration loss determined based on the polygon mesh of the exterior surface of the gripper relative to the polygon mesh of the exterior surface of the object;

a contact heatmap loss determined based on (a) the polygon mesh of the exterior surface of the gripper relative to the polygon mesh of the exterior surface of the object and (b) the polygon mesh of the exterior surface of the human hand relative to the polygon mesh of the exterior surface of the object; and an orientation loss determined based on an orientation of vectors of the gripper relative to an orientation of vectors of the human hand.

11. The robot system of claim 10 wherein the total loss is determined further based on a gripper self-penetration loss determined based on contact between a first portion of the gripper and a second portion of the gripper.

12. The robot system of claim 11 further comprising a total loss module configured to:

increase the gripper self-penetration loss as contact between a first portion of the gripper and a second portion of the gripper increases; and decrease the gripper self-penetration loss as contact between the first portion of the gripper and the second portion of the gripper decreases.

13. The robot system of claim 10 further comprising an object penetration loss module configured to increase the object penetration loss when a tip of a finger of the gripper extends into the exterior surface of the object.

14. The robot system of claim 13 wherein the object penetration loss module is configured to decrease the object penetration loss as the tip of the finger of the gripper approaches the exterior surface of the object.

15. The robot system of claim 10 further comprising a total loss module configured to determine the orientation loss based on images from a camera of the robot.

16. The robot system of claim 15 wherein the total loss module is configured to determine the orientation loss further based on at least one image of the human hand grasping the object.

17. The robot system of claim 10 further comprising a total loss module configured to determine the orientation loss based on measurements from one or more sensors of the robot.

18. The robot system of claim 10 further comprising a total loss module configured to:

decrease the contact heatmap loss as contact between the gripper and the exterior surface of the object becomes more similar to contact between the human hand and the exterior surface of the object; and increase the contact heatmap loss as contact between the gripper and the exterior surface of the object becomes less similar to contact between the human hand and the exterior surface of the object.

19. A method, comprising:

based on a demonstration of a human hand grasping an object, determining (a) a first vector that is normal to a palm of the human hand, (b) a second vector that is parallel to the palm of the human hand, and (c) a position of the human hand;

determining (a) a third vector that is normal to a palm of a gripper of a robot, (b) a fourth vector that is parallel to the palm of the gripper of the robot, and (c) a present position of the gripper;

(1) actuating one or more actuators of the robot and moving the gripper when the gripper is open such that the present position of the gripper is at the position of the human hand, the third vector is aligned with the first vector, and the fourth vector is aligned with the second vector;

after (1), (2) actuating one or more actuators of the robot and closing fingers of the gripper based on minimizing an object penetration loss; and when the object penetration loss is minimized, (3) actuating one or more actuators of the robot and actuating the fingers of the gripper to minimize a total loss determined based on the object penetration loss and at least one other loss.

20. The method of claim 19 further comprising increasing the object penetration loss when a tip of a finger of the gripper extends into an exterior surface of the object.

21. The method of claim 20 further comprising decreasing the object penetration loss as the tip of the finger of the gripper approaches the exterior surface of the object.

22. The method of claim 19 wherein determining the third vector, the fourth vector, and the present position of the gripper includes determining the third vector, the fourth vector, and the present position of the gripper based on images from a camera of the robot.

23. The method of claim 19 wherein determining the third vector, the fourth vector, and the present position of the gripper includes determining the third vector, the fourth vector, and the present position of the gripper based on measurements from one or more sensors of the robot.

24. The method of claim 19 further comprising determining the total loss based on the object penetration loss and the at least one other loss, wherein the at least one other loss includes a contact heatmap loss and the method further includes:

decreasing the contact heatmap loss as contact between the gripper and the exterior surface of the object becomes more similar to contact between the human hand and an exterior surface of the object; and increasing the contact heatmap loss as contact between the gripper and the exterior surface of the object becomes less similar to contact between the human hand and the exterior surface of the object.

25. The method of claim 19 further comprising determining the total loss based on the object penetration loss and the at least one other loss, wherein the at least one other loss includes an orientation loss and the method further includes:

decreasing the orientation loss as at least one of (a) the third vector approaches the first vector and (b) the fourth vector approaches the second vector; and increasing the orientation loss as at least one of (a) the third vector moves away from the first vector and (b) the fourth vector moves away from the second vector.

26. The method of claim 19 further comprising determining the total loss based on the object penetration loss and the at least one other loss, wherein the at least one other loss includes a gripper self-penetration loss and the method further includes:

increasing the gripper self-penetration loss as contact between a first portion of the gripper and a second portion of the gripper increases; and decreasing the gripper self-penetration loss as contact between the first portion of the gripper and the second portion of the gripper decreases.

27. The method of claim 19 further comprising determining the total loss based on the object penetration loss and the at least one other loss, wherein the at least one other loss includes a contact heatmap loss, an orientation loss, and a gripper self-penetration loss and the method further includes:

decreasing the contact heatmap loss as contact between the gripper and the exterior surface of the object becomes more similar to contact between the human hand and the exterior surface of the object;

increasing the contact heatmap loss as contact between the gripper and the exterior surface of the object becomes less similar to contact between the human hand and the exterior surface of the object;

decreasing the orientation loss as at least one of (a) the third vector approaches the first vector and (b) the fourth vector approaches the second vector; and increasing the orientation loss as at least one of (a) the third vector moves away from the first vector and (b) the fourth vector moves away from the second vector;

increasing the gripper self-penetration loss as contact between a first portion of the gripper and a second portion of the gripper increases; and decreasing the gripper self-penetration loss as contact between the first portion of the gripper and the second portion of the gripper decreases.

28. A method, comprising:

determining a polygon mesh of an exterior surface of an object to be grasped by a gripper of a robot;

determining a polygon mesh of an exterior surface of a human hand grasping the object;

determining a polygon mesh of an exterior surface of the gripper of the robot;

determining an object penetration loss based on the polygon mesh of the exterior surface of the gripper relative to the polygon mesh of the exterior surface of the object;

determining a contact heatmap loss based on (a) the polygon mesh of the exterior surface of the gripper relative to the polygon mesh of the exterior surface of the object and (b) the polygon mesh of the exterior surface of the human hand relative to the polygon mesh of the exterior surface of the object;

determining an orientation loss determined based on an orientation of vectors of the gripper relative to an orientation of vectors of the human hand; and actuating actuators of the robot based on minimizing a total loss determined based on the object penetration loss, the contact heatmap loss, and the orientation loss.

29. The method of claim 28 further comprising determining a gripper self-penetration loss determined based on contact between a first portion of the gripper and a second portion of the gripper, wherein determining the total loss includes determining the total loss further based on the gripper self-penetration loss.

30. The method of claim 29 further comprising:

increasing the gripper self-penetration loss as contact between a first portion of the gripper and a second portion of the gripper increases; and decreasing the gripper self-penetration loss as contact between the first portion of the gripper and the second portion of the gripper decreases.

31. The method of claim 28 further comprising increasing the object penetration loss when a tip of a finger of the gripper extends into the exterior surface of the object.

32. The method of claim 31 further comprising decreasing the object penetration loss as the tip of the finger of the gripper approaches the exterior surface of the object.

33. The method of claim 28 further comprising determining the orientation loss based on images from a camera of the robot.

34. The method of claim 33 further comprising determining the orientation loss further based on at least one image of the human hand grasping the object.

35. The method of claim 28 further comprising determining the orientation loss based on measurements from one or more sensors of the robot.

36. The method of claim 28 further comprising:

decreasing the contact heatmap loss as contact between the gripper and the exterior surface of the object becomes more similar to contact between the human hand and the exterior surface of the object; and increasing the contact heatmap loss as contact between the gripper and the exterior surface of the object becomes less similar to contact between the human hand and the exterior surface of the object.

\* \* \* \* \*